UNITED STATES PATENT OFFICE.

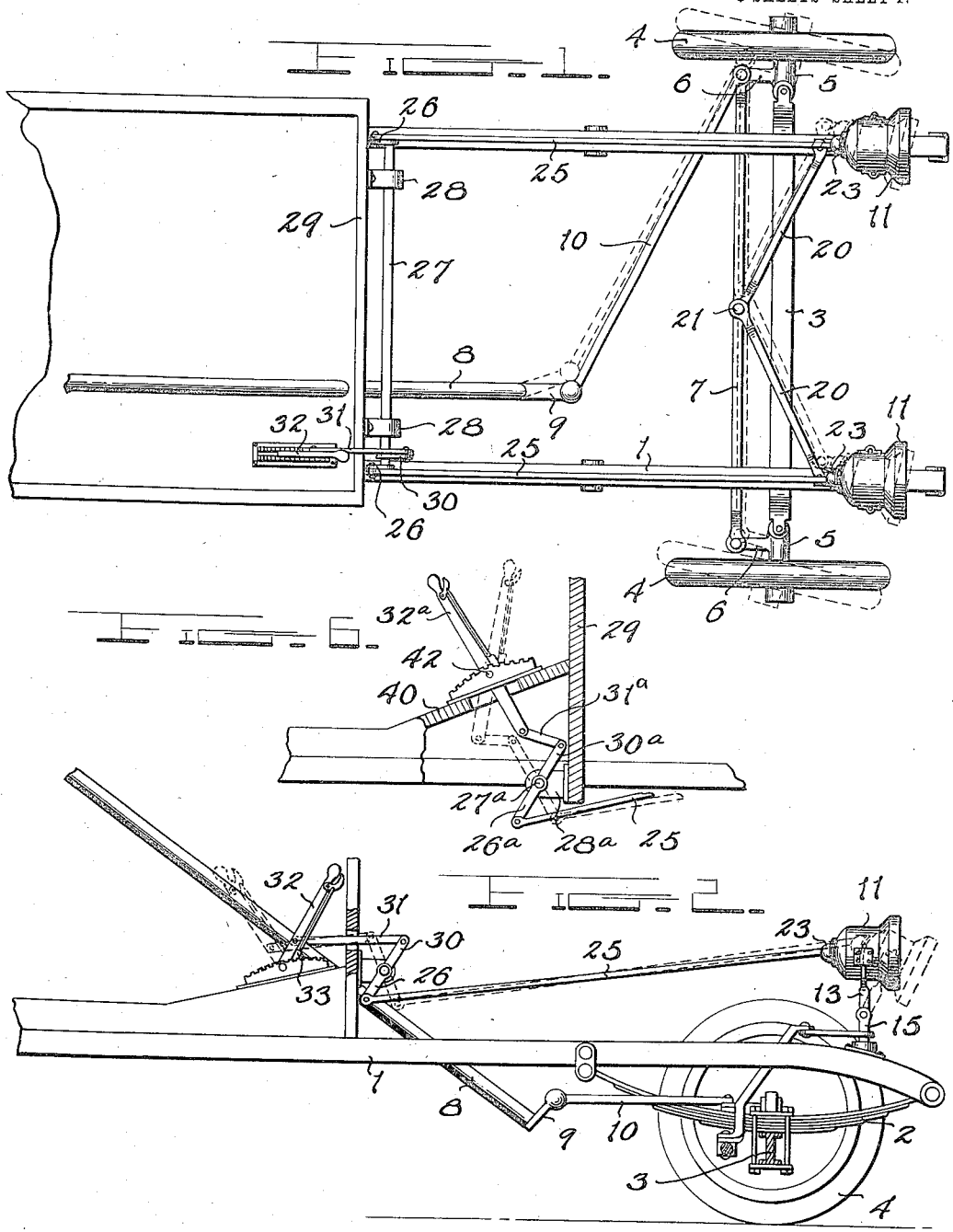

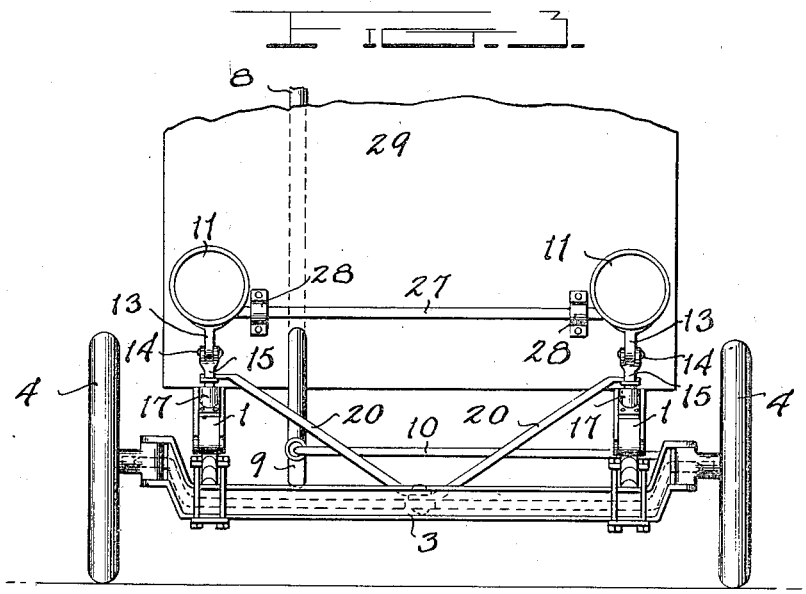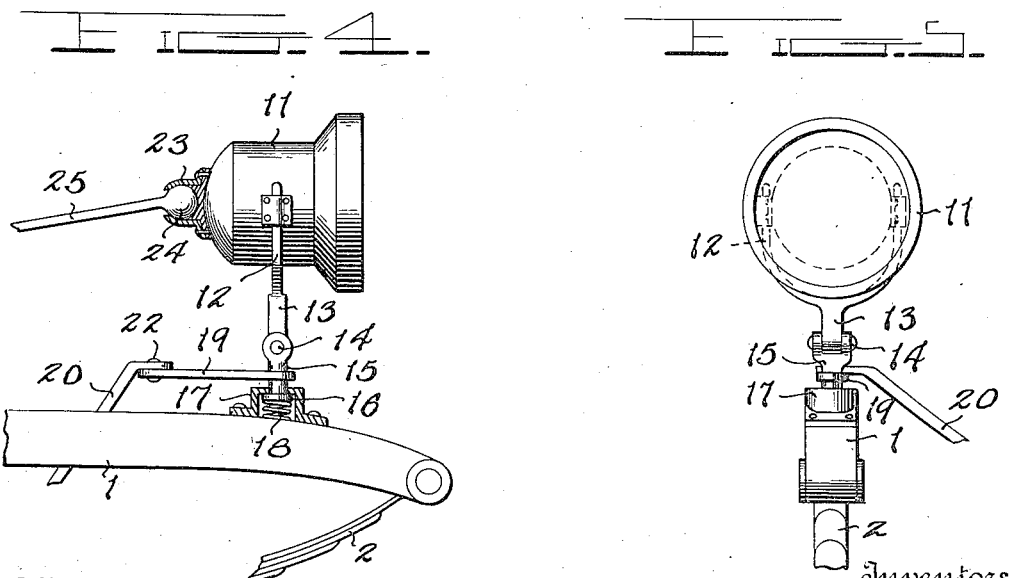

LEE C. THOMPSON AND JAMES A. GARRIS, OF ALBION, PENNSYLVANIA.

DIRIGIBLE AUTOMOBILE-HEADLIGHT.

1,133,681.      Specification of Letters Patent.      Patented Mar. 30, 1915.

Application filed October 29, 1914. Serial No. 869,229.

*To all whom it may concern:*

Be it known that we, LEE C. THOMPSON and JAMES A. GARRIS, both citizens of the United States, residing at Albion, in the county of Erie and State of Pennsylvania, have invented certain new and useful Improvements in Dirigible Automobile-Headlights, of which the following is a specification.

The present invention relates to certain new and useful improvements in dirigible lamps for automobiles and like vehicles, and has for its object to provide a device of this character which embodies novel features of construction whereby the lamps may be caused to turn laterally as the vehicle is steered to the right or to the left and may also be swung up or down as desired.

A further object of the invention is to provide a dirigible lamp of this character which is comparatively simple and inexpensive in its construction, which can be readily mounted upon a motor vehicle without interfering with the usual operation thereof, and which admits of the lamps being tilted vertically so that the light may be either thrown straight ahead or down upon the road directly in front of the vehicle.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a portion of the chassis of a motor vehicle, showing the dirigible lamps mounted thereon, the lamps being shown by full lines in the position assumed when the vehicle is moving ahead in a straight line, and by dotted lines in the position assumed when the vehicle is being turned. Fig. 2 is a side elevation of the same with portions broken away and shown in section, the lamps being shown by full lines in an upright position and by dotted lines as tilted forward. Fig. 3 is a front elevation of the chassis with the dirigible lamps mounted thereon, portions being broken away. Fig. 4 is an enlarged side elevation of one of the lamps and the mounting therefor, portions being shown in section. Fig. 5 is a front elevation of one of the lamps and the mounting therefor. Fig. 6 is a detail view showing a modification in which the rock shaft controlling the lamps is placed at the rear of the dashboard and under the floor.

Corresponding and like parts are referred to in the following description and indicated in all the views of the drawings by the same reference characters.

For the purpose of illustration the dirigible lamps are shown as mounted upon a conventional motor vehicle chassis. The numerals 1 designate the side bars of the chassis, 2 the front springs, 3 the front axle which is secured to the springs 2, 4 the front wheels, 5 the spindles upon which the front wheels are mounted, 6 the spindle arms, 7 the spindle arm connecting rod, 8 the steering post, 9 the steering post arm, and 10 the steering post connecting rod. These parts may be of any conventional or suitable construction, and all parts not necessary to show the dirigible lamps and manner of mounting the same have been omitted.

The lamps 11 may be of any suitable construction and are each mounted upon the forked upper end 12 of a standard 13. The lower end of each of the standards 13 is hinged at 14 to the upper end of a vertical shaft 15 which is suitably mounted upon the chassis so as to turn about a vertical axis. It will thus be obvious that by rotating the vertical shaft 15 the lamp can be turned to the right or to the left, while by swinging the standard 13 about its hinged connection with the vertical shaft 15 the lamp may be swung up and down. In the present instance the lower end of the vertical shaft 15 is shown as terminating in a head 16 which is received within a hollow bearing cup 17 rigidly applied to the side bar 1. A coil spring 18 may be interposed between the top of the side bar and the head 16 so as to hold the vertical shaft yieldably in proper position, although the shaft is free to turn freely about a vertical axis.

Rigid with each of the vertical shafts 15 and projecting rearwardly therefrom is an arm 19, said arms being connected by the diagonal links 20 to an intermediate portion of the spindle arm connecting rod 7. These links 20 are pivotally connected to the said spindle arm connecting rod 7 at 21 and in a similar manner are pivotally connected to the respective arms 19 as indicated at 22.

With this construction it will be obvious that the two lamps 18 will both turn simultaneously with the front wheels 4 and in the same direction as the front wheels when the machine is turned either to the right or to the left.

Secured to the back of each of the lamps 11 is a socket plate 23 which loosely receives a ball 24 at the forward end of a rod 25. One of these rods 25 extends rearwardly from each of the lamps 11 and the rear ends thereof are pivotally connected to downwardly extending crank arms 26 at opposite ends of a horizontally disposed rock shaft 27. This rock shaft 27 is shown as journaled upon bearing brackets 28 projecting forwardly from the dash board 29. Projecting upwardly from the rock shaft 27 and rigid therewith is an arm 30, said arm being connected by a link 31 which passes through the dash board 29 to an operating lever 32 arranged in such a position as to be readily grasped by the driver of the machine. The usual latch means 33 may be provided for holding the operating lever 32 in an adjusted position, and it will be obvious that by suitably manipulating this lever the rock shaft 27 may be rotated and motion transmitted to the lamps 11 so as to swing the lamps up and down and either cause the light to be projected straight forward in advance of the machine or thrown down at a sharp angle upon the road immediately in front of the machine. The lamps could thus be quickly tilted forward at any time so as to prevent them from having a blinding effect upon the driver of a machine moving in the opposite direction.

A slight modification is shown by Fig. 6 in which the rock shaft 27ª is shown as mounted back of the dashboard 29 and under the floor boards 40. Suitable bearing brackets 28ª project rearwardly from the dashboard 29 at the bottom thereof and have the rock shaft 27ª journaled therein. This rock shaft is formed with the downwardly projecting crank arms 26ª to which the rear ends of the rods 25 are connected. An arm 30ª projects upwardly from the rock shaft 27ª and is connected by a link 31ª to the lower end of a hand lever 32ª which is pivoted at an intermediate point in its length as indicated at 42. When this hand lever 32ª is pulled rearward, as indicated by full lines upon Fig. 6, the lamps 11 are in an upright position so as to project a light straight ahead, although when the hand lever is pushed forward, is indicated by dotted lines, the lamps 12 are tilted forward so as to throw the light down at a sharp angle upon the road immediately in front of the machine. When applying the invention to many forms of machines it will be found more satisfactory to place the rock shaft at the rear of the dashboard, as indicated by Fig. 6, than to place it at the front of the dashboard, as shown by the remaining figures.

Having thus described the invention, what we claim as new and desire to secure by Letters Patent, is:—

1. A dirigible lamp for motor vehicles including a lamp, a standard carrying the lamp, a vertical shaft journaled upon the motor vehicle so as to turn about a vertical axis and having the standard hingedly connected thereto so as to swing about a horizontal axis, means for rotating the vertical shaft to turn the lamp laterally, a socket plate applied to the lamp, a rod terminating in a ball engaged by the socket plate, and means for manipulating the rod to tilt the lamp vertically.

2. A dirigible lamp for motor vehicles including a lamp, a standard carrying the lamp, a vertical shaft journaled upon the motor vehicle so as to turn about a vertical axis and having the standard hinged thereto so as to swing about a horizontal axis, means for rotating the vertical shaft to swing the lamp laterally, a socket plate applied to the back of the lamp, a rock shaft upon the dash board of the vehicle, a crank arm projecting from the rock shaft, a rod having one end thereof connected to the crank arm while the opposite end thereof terminates in a ball loosely engaged by the socket plate of the lamp, and means for operating the rock shaft to tilt the lamp vertically.

3. A dirigible lamp for motor vehicles including a pair of lamps, a standard carrying each lamp, a vertical shaft for each lamp, said vertical shafts being journaled upon the motor vehicle so as to turn about a vertical axis and having the respective standards hingedly connected thereto so as to swing about a horizontal axis, means for rotating the vertical shafts to swing the lamps laterally, a rock shaft journaled upon the front of the dashboard of the vehicle, crank arms projecting from the rock shaft, forwardly extending rods connected to the said crank arms and terminating in balls, socket plates engaging the balls and applied to the lamps, an operating lever, and an operative connection between the said lever and the rock shaft for simultaneously swinging both of the lamps vertically.

4. A dirigible lamp for motor vehicles including a pair of lamps, a standard carrying each lamp, a vertical shaft for each standard, said vertical shafts being journaled upon the motor vehicle so as to each turn about a vertical axis and having the corresponding standards hingedly connected thereto so as to turn about a horizontal axis, lateral arms projecting from the vertical shafts, link members connecting the lateral arms to the spindle arm connecting rod of the vehicle to automatically turn the lamps when the front wheels are turned to the right or to the left, a rock shaft upon the dashboard of the vehicle, crank arms projecting from the rock shaft, forwardly extending rods connected to the crank arms and terminating in balls, socket plates loosely receiving the balls and applied to the lamps, an operating lever, and an operative connection between the lever and the rock shaft for simultaneously tilting both of the lamps vertically.

In testimony whereof we affix our signatures in presence of two witnesses.

LEE C. THOMPSON.
JAMES A. GARRIS.

Witnesses:
E. A. COLLINS,
WM. L. SCOTT.